US006389393B1

(12) United States Patent
Gong

(10) Patent No.: US 6,389,393 B1
(45) Date of Patent: May 14, 2002

(54) METHOD OF ADAPTING SPEECH RECOGNITION MODELS FOR SPEAKER, MICROPHONE, AND NOISY ENVIRONMENT

(75) Inventor: Yifan Gong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/292,180

(22) Filed: Apr. 15, 1999

Related U.S. Application Data

(60) Provisional application No. 60/083,309, filed on Apr. 28, 1998.

(51) Int. Cl.$^7$ .............................................. G10L 15/06
(52) U.S. Cl. ...................................................... 704/244
(58) Field of Search ................................. 704/244, 233, 704/256, 255

(56) References Cited

U.S. PATENT DOCUMENTS 5,353,376 A * 10/1994 Oh et al. ..................... 704/233
5,950,157 A * 9/1999 Heck et al. .................. 704/234

OTHER PUBLICATIONS

Angelini, B., F. Brugnara, D. Falavigna, D. Giuliani, R. Gretter, and M. Omologo, "Speaker Independent contiuous Speech Recognition using an Acoustic–Phonetic Italian Corpus," Proc. ICSLP, Yokohama, vol. 3, pp. 1391–1394, Sep. 1994.*

Gales, M. J. F., Pye, and P. C. Woodland, "Variance Compensation within the MLLR Framework for Robust Speech Recognition and Speaker Adaptation," Proc. Fourth Int. Conf on Spoken Language ICSLP 1996, vol. 3, pp. 1832–1835, Oct. 3–6, 1996.*

Guiliani, D., M. Matassoni, M. Omologo, and P. Svaizer, "Experiments of HMM Adaptation for Hands–Free Connected Digit Recognition," Proc. 1998 IEEE Int. Conf. on Acoust., Speech and Sig. Proc., vol. 1, pp. 474–476, May 12–15, 1998.*

Guiliani, D., M. Matassoni, M. Omologo, and P. Svaizer, "Training of HMM with Filtered Speech Material for Hands– Free Recognition," Proc. 1999 IEEE Int. Conf. on Acoust., Speech and Sig. Proc., vol. 1, pp. 449–452, Mar. 15–19, 1999.*

Guiliani, D., M. Omologo, and P. Svaizer, "Experiments of Speech Recognition in a Noisy and Reverberant Environment using a Microphone Array and Hmm Adaptation," Proc. Fourth Int. Conf on Spoken Language ICSLP 1996, vol. 3, pp. 1329–1332, Oct. 3–6, 1996.*

Legetter, C. J. and P. C. Woodland, "Speaker Adaptation of Continuous Density HMMs using Multivariate Linear Regression," Proc. ICSLP 94, vol. 2, pp. 451–454, Sep. 1994.*

Omologo, Maurizio, Marco Matassoni Piergiorgio Svaizier, and Diego Giuliani, "Microphone Array Based Speech Recognition With Different Talker–Array Positions," ICASSP–97 1997 IEEE Int. Conf. Acoust, Speech, Sig. Proc., vol. 1, pp. 227–230, Apr. 21–24,1997.*

Woodland, P.C., D. Pye, and M. J. F. Gales, "Iterative Unsupervised Adaptation Using Maximum Likelihood Linear Regression," Proc. Fourth Int. Conf. on Spoken Language ICSLP 96, vol. 2, pp. 1133–1136, 1996.*

* cited by examiner

Primary Examiner—William Korzuch
Assistant Examiner—Donald L. Storm
(74) Attorney, Agent, or Firm—Robert L. Troike; Frederick J. Telecky, Jr.

(57) ABSTRACT

The recognition of hands-free speech in a car environment has to deal with variabilities from speaker, microphone channel and background noises. A two-stage model adaptation scheme is presented. The first stage adapts speaker-independent HMM seed model set to a speaker and microphone dependent model set. The second stage adapts speaker and microphone-dependent model set to a speaker, microphone, and noise dependent model set, which is then used for speech recognition. Both adaptations are based on maximum-likelihood linear regression (MLLR).

6 Claims, 3 Drawing Sheets

METHOD OF ADAPTING SPEECH RECOGNITION MODELS FOR SPEAKER, MICROPHONE, AND NOISY ENVIRONMENT

This application claims priority under 35 USC § 119(e)(1) of provisional application No. 60/083,309, filed Apr. 28, 1998.

FIELD OF THE INVENTION

This invention relates to modeling speech for speech recognition and more particularly to provide speech recognition in a noisy environment.

BACKGROUND OF THE INVENTION

Automatic speech recognizers exhibit rapid degradation in performance when there is a mismatch between training and testing conditions. This mismatch can be caused by speaker variability, additive acoustic environmental noise and convolutive distortions due to the use of different telephone channels. All these variabilities are also present in an automobile environment and this degrades the performance of speech recognizers when used in an automobile.

Several techniques have been proposed to improve the robustness of speech recognizers under mismatch conditions (Y. Gong, "Speech Recognition in Noisy Environments: A Survey," *Speech Communication*, 16(3): 261–291, April 1995). These techniques fall under the following two main categories:

- feature pre-processing techniques such as spectral subtraction, cepstral mean normalization (CMN), which aim at modifying the corrupted features so that the resulting features are closer to those of clean speech.
- model adaptation techniques such as maximum likelihood linear regression (C. J. Leggetter and P. C. Woodland, "Maximum Likelihood Linear Regression for Speaker Adaptation of Continuous Density HMMs," *Computer, Speech and Language*, 9(2): 171–185, 1995), maximum a posteriori (IAP) estimation (J. L. Gauvain and C. H. Lee, "Maximum A Posteriori Estimation for Multivariate Gaussian Observations of Markov Chains," *IEEE Trans. on Speech and Audio Processing*, 2(2): 291–298, April 1994), parallel model combination (PMC) (M. J. F. Gales, "'NICE' Model-Based Compensation Schemes for Robust Speech Recognition," *Proc. ESCA-NATO Tutorial and Research Workshop on Robust Speech Recognition for Unknown Communication Channels*, pages 55–64, April 1997), in which model parameters of the corrupted speech model are estimated, to account for the mismatch.

SUMMARY OF THE INVENTION

In accordance with one embodiment of the present invention a two-stage model adaptation scheme is provided wherein the first stage adapts speaker-independent HMM (Hidden Markov Model) seed model set to a speaker and microphone dependent model set and in the second stage the speaker and microphone dependent model set is adapted to a speaker and noise-dependent model set.

DESCRIPTION OF PREFERRED EMBODIMENTS OF THE PRESENT INVENTION

The recognition of hands-free telephone speech in a car environment has to deal with variabilities from speaker, telephone channel and background noises.

The difficulty of recognizing hands-free telephone speech consists in the need of modeling simultaneous additive (background) and convolutive (channel and speaker variability) noises. Some techniques based on model combination (M. J. F. Gales, "PMC for Speech Recognition in Additive and Convolutional Noise," Technical Report TR-154, CUED/FINFENG, December 1993 and Y. Minami and S. Furui, "Adaptation Method Based on HMM Composition and EM Algorithm," *Proc. of IEEE Internat. Conf. on Acoustics, Speech and Signal Processing*, pages 327–330, Atlanta, 1996) and on joint estimation of biases (M. Afify, Y. Gong and J. P. Haton, "A Unified Maximum Likelihood Approach to Acoustic Mismatch Compensation: Application to Noisy Lombard Speech Recognition," *Proc. of IEEE Int. Conf. on Acoustics, Speech and Signal Processing*, Germany, 1997) can be exploited to address such problems.

In car environment operations, for safety and fuel economy, it is desirable not to do any speaker training when the car is running. For speech recognition in car environment, by turning the engine off, it is possible to obtain some adaptation utterances which can be assumed containing no additive noise.

In accordance with the present invention, we take advantage of this fact and perform two adaptation steps: microphone and speaker adaptation followed by background noise adaptation.

Because of the changing environment conditions, we consider a model adaptation technique with a two-stage adaptation scheme as follows.

Figure 1:
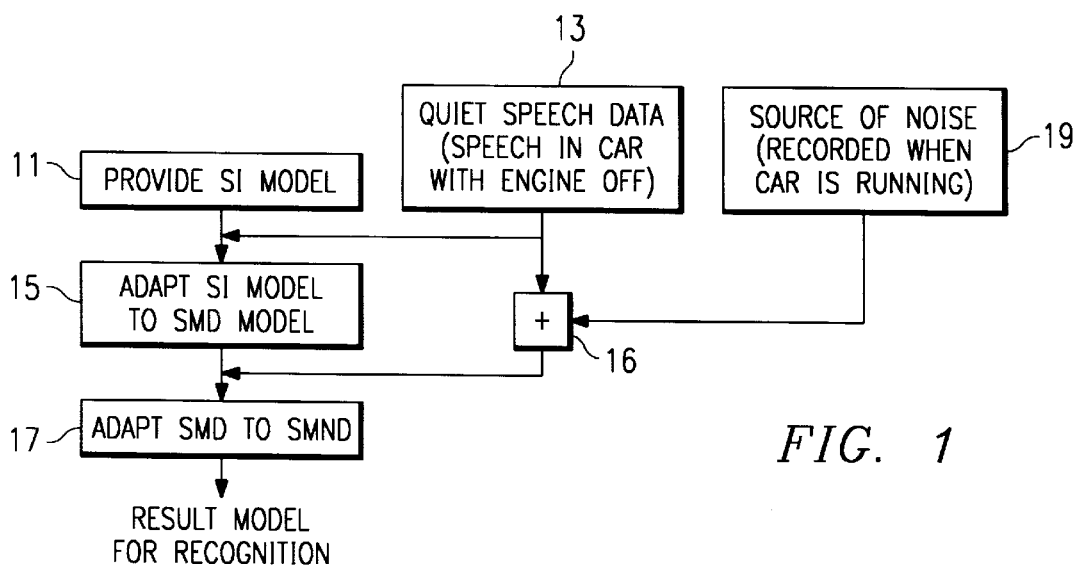
FIG. 1 is a block diagram of the steps according to one embodiment of the present invention.

Referring to FIG. 1, the first stage adapts a speaker-independent (SI) HMM seed model set to a speaker-and-microphone-dependent (SMD) model set. The first step 11 is to provide the speaker independent models. The speaker-independent models are trained with speech data collected through public telephone network. In the second step 13, data is provided representing recorded speech by the user in the car with the engine turned off. This is used in step 15 to adapt the speaker independent model to achieve the SMD model set. The purpose is to specialize the HMM set to the particular speaker and the microphone, through adaptation in step 15. Adaptation data in step 13 are the utterances collected while the engine is off. Techniques based on deterministic transformations such as linear regression (LR) (C. J. Leggetter and P. C. Woodland, "Maximum Likelihood Linear Regression for Speaker Adaptation of Continuous Density HMMs," *Computer, Speech and Language*, 9(2): 171–185, 1995), phone-dependent bias (Y. Zhao, "A Speaker-Independent Continuous Speech Recognition System Using Continuous Mixture Gaussian Density HMM of Phoneme-Sized Units," *IEEE Trans. on Speech and Audio Processing*, 1(3): 345–361, July 1993), stochastic matching (A. Sankar and C. H. Lee, "Stochastic Matching for Robust Speech Recognition," *IEEE Signal Processing Letters*, 1:

124–125, August 1994) and maximum a posteriori (MAP) estimation (J. L. Gauvain and C. H. Lee, "Maximum A Posteriori Estimation for Multivariate Gaussian Observations of Markov Chains," *IEEE Trans. on Speech and Audio Processing*, 2(2): 291–298, April 1994) are potential candidates. Applicant uses maximum likelihood linear regression (MLLR) for its efficient use of small amount of adaptation data and ability of state-dependent adaptation.

The second stage step 17 is to adapt the speaker-dependent model set (SMD) to a speaker-and-noise dependent (SMND) model set, which is then used for speech recognition. No additional adaptation utterance is required. The purpose is to tune the SMD-HMM set to suit the particular background noise. This adaptation could be performed each time a new type of background noise is detected. Existing solutions include model combination (M. J. F. Gales and S. Young, "An Improved Approach to the Hidden Markov Model Decomposition of Speech and Noise," *Proc. of IEEE Internat. Conf. on Acoustics, Speech and Signal Processing*, Vol. I, pages 233–236, U.S.A., April 1992), log spectrum masking (A. P. Varga and R. K. Moore, "Hidden Markov Model Decomposition of Speech and Noise," *Proc. of IEEE Internat. Conf. on Acoustics, Speech and Signal Processing*, pages 845–848, 1990) and MLLR adaptation (O. Siohan, Y. Gong and J. P. Haton, "Comparative Experiments of Several Adaptation Approaches to Noisy Speech Recognition Using Stochastic Trajectory Models," *Speech Communication*, 18:335–352, 1996), which we use in the present embodiment. The source of noise at 19 is added to the data in step 13 at step 16 to adapt the SMD model at step 17. The source of the noise is from a recording of noise in the car.

Our problem involves both convolutive (microphone, channel) and additive (background) noise. In addition, for efficient speaker adaptation, state-dependent model adaptation is required. Therefore, MLLR is adopted for adaptation which has been shown to be very effective for convolutive component adaptation and additive noise adaptation. In the experiments reported herein, source normalized HMM (Y. Gong, "Source Normalization Training for HMM Applied to Noisy Telephone Speech Recognition," *Proceedings of European Conference on Speech Technology*, Rodes, Greece, September 1997) is used, which treats MLLR adaptation as a special case. To make the solution practically more attractive, we choose to use a small number of adaptation utterances.

The recognition task is digit sequence of length 7 or 10. The database is recorded with a hands-free speaker-phone for 19 speakers. In total, 672 utterances are available for experiments.

The noisy environment is simulated by adding noise to speech signals recorded from speaker-phone. Two noise types have been tested. One is highway car (HWY) noise recorded with a microphone mounted to the visor. The other is computer generated Gaussian (GSN) white noise. We generated a variety of SNR: 36 dB, 30 dB, 24 dB, 18 dB. To obtain a desired SNR, the noise is added in the power-spectral domain to the utterances of test speech.

Figure 2:
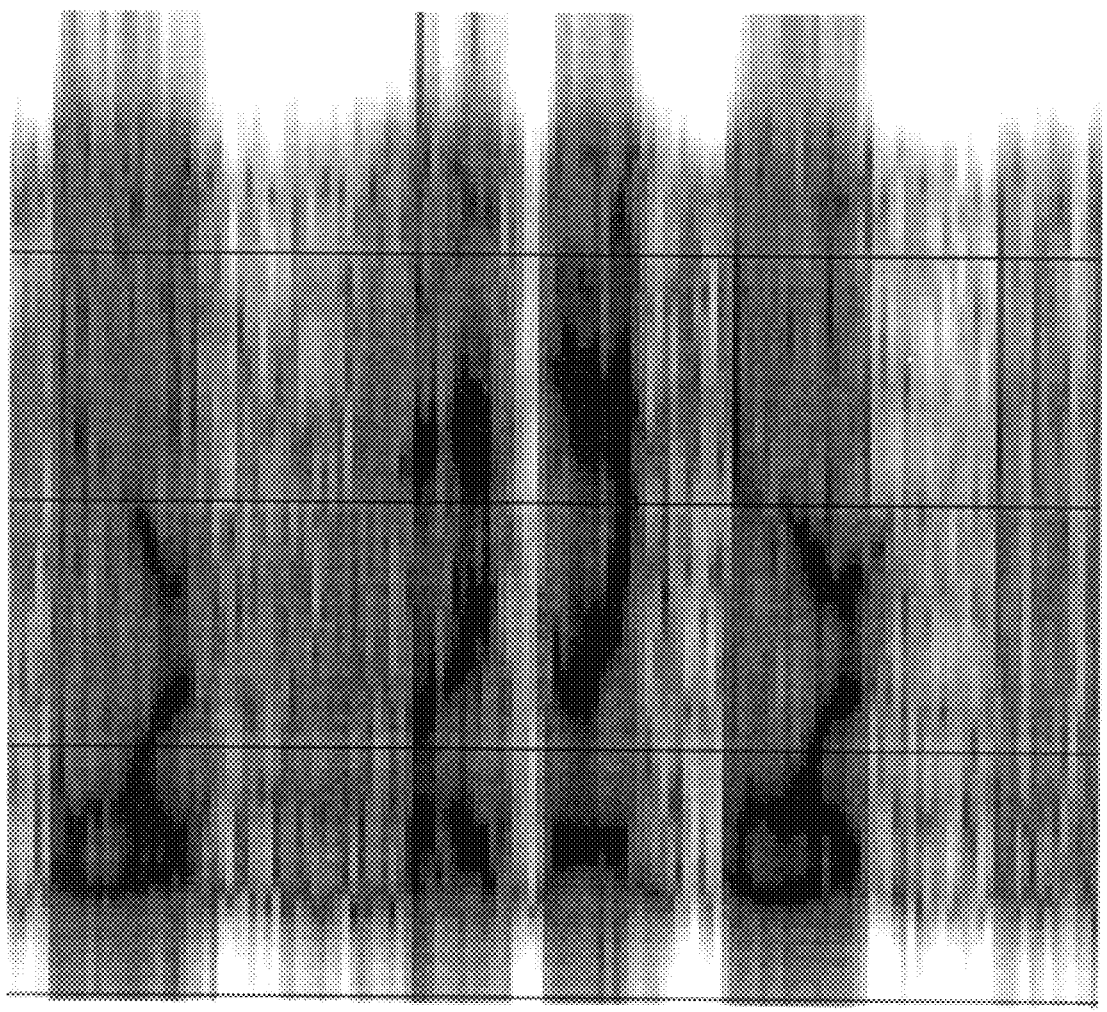
FIG. 2 illustrates a digit sequence utterance recorded by hands-free microphone in a car.
Figure 3:
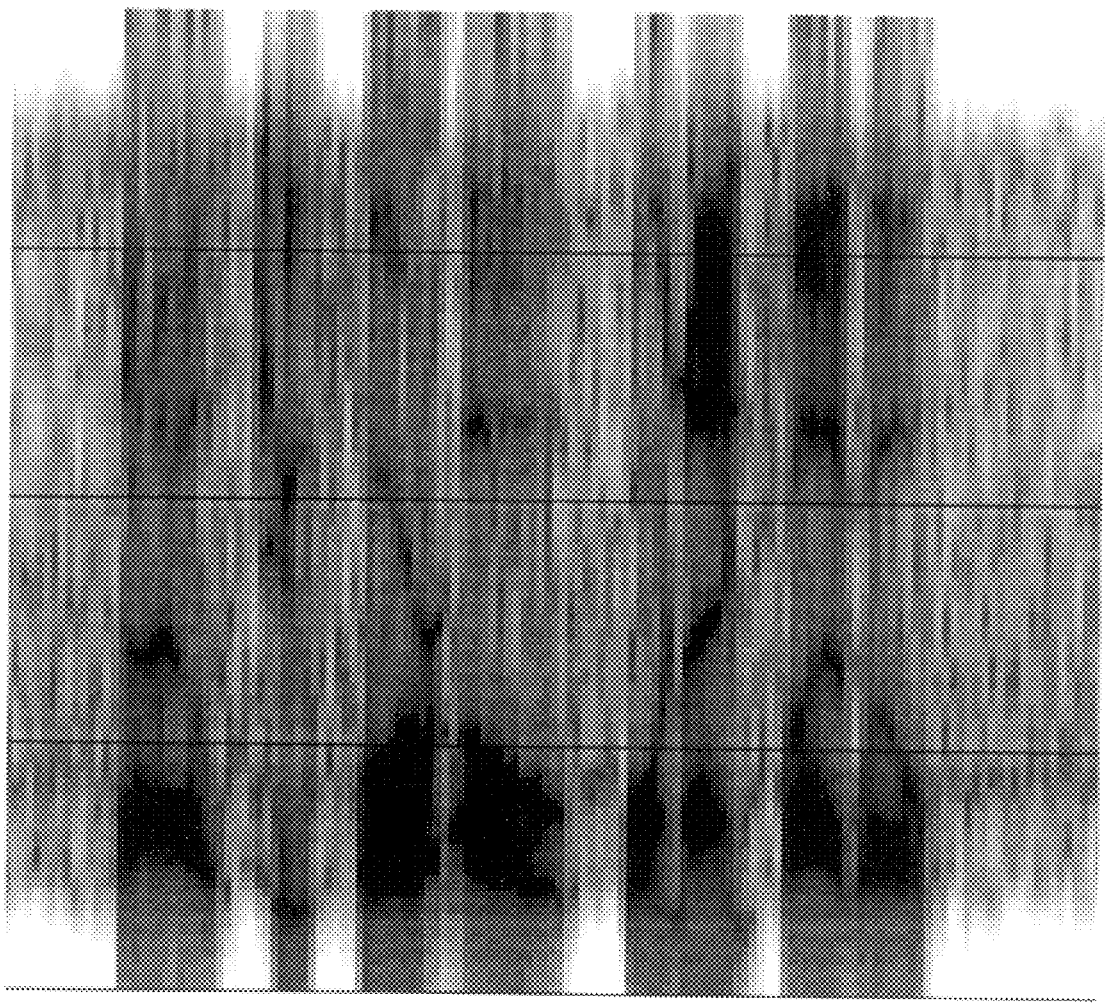
FIG. 3 illustrates a digit sequence utterance recorded by speaker-phone and then added with 24 dB SNR noise.

To visually compare the signals with added noise and signals recorded by hands-free microphone in a car, two spectrograms are produced. FIG. 2 shows a typical digit sequence recorded by hands-free microphone in a car and FIG. 3 shows a digit sequence recorded by speaker-phone and then added noise to 24 dB SNR. We perceive that visually the two SNRs are close to each other.

We use 8 kHz sampling rate, 20 ms frame rate with pre-emphasis. Observation vectors are $10^{th}$-LPCC derived 13 MFCC with their regression-based first order time derivatives. Cepstral mean normalization (CMN) is used throughout the experiments. Acoustic models are phonetic Gaussian Mixture HMM (GMHMM). The phone models are context-dependent. There are 47 models for digit recognition. The HMMs have in average about 5 states.

The baseline HMM models for adaptation is trained with 9596 digit sequence utterances of a public speech database known as Macrophone database. The models are evaluated on 1207 digit sequence utterances (12198 digits) held out of the training utterances, as function of typical number of mixture components per state (M). Without male/female separate modeling, for M=20, the WER is 1.11%. This configuration with an average 16 components per HMM state, 2797 Gaussian distributions in total, will be used as baseline system for adaptation.

For adequate speaker and background noise adaptation, state-dependent LR is required. However, in practice the amount of speech for adaptation is limited to a few utterances.

To deal with the sparseness of training data, a phone-to-class mapping is needed. With such map, given any phone, it is possible to determine the set of acoustically similar phones and derive transformation using the observations of the set. This map should be dependent on the number of training data tokens, i.e., the larger the number of tokens is, the larger the number of classes. In the tests, the map is based on hierarchically clustered phone-models.

The sufficient statistics used to calculate the adaptation parameter of a given phone is determined by the hierarchy. In each node of the hierarchy are stored two types of information:

The sum of the observation numbers of all immediate descendent nodes.

The sufficient statistics summed over all immediate descendent nodes.

A terminal node (leaf) corresponds to a phone, containing observation number of the phone in the adaptation utterances and the sufficient statistics of the phone.

Given a phone s, the adaptation parameter is computed using the sufficient statistics associated to the first node (traveling upwards) n(s) having the sum of the observation numbers larger than a pre-specified threshold $\alpha$.

Figure 4:
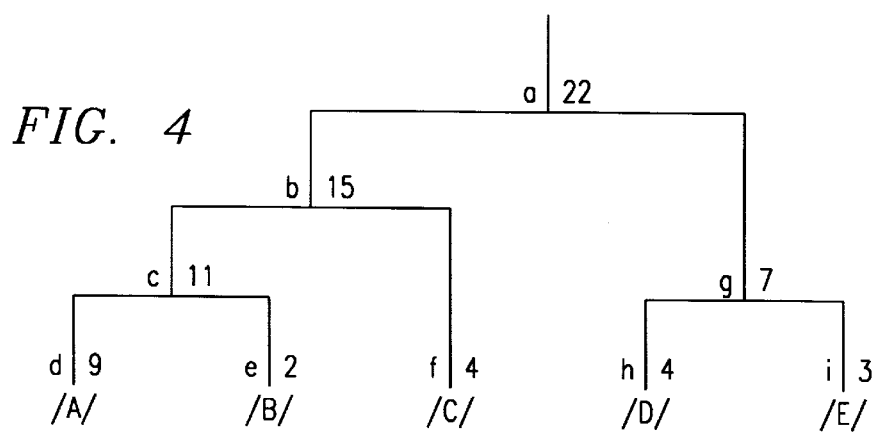
FIG. 4 illustrates an example of phonetic hierarchy.

For the case shown in FIG. 4, with $\alpha=5$, n(A)=d, n(B)=c, n(C)=b and n(D)=n(E)=g.

The adaptations are supervised, i.e., the phonetic transcription of the adaptation utterances are known to the system. Six digit sequence utterances are used for adaptation. The adaptation EM-algorithm iterates twice for each adaptation.

To prevent utterance segmentation for noise adaptation from being disturbed by background noise, the segmentation obtained from speaker adaptation stage (step 15 in FIG. 1) is used as the initial segmentation of the noise adaptation stage.

The SI recognition of the entire test data (no noise added) with Macrophone-trained HMM gives 3.77% WER. Compared to the baseline 1.11%, we deduce the presence of a large mismatch (before adding noise) in the testing database. We performed MLLR on the test data and obtained 0.73% WER.

TABLE 1

Recognition results for HWY noise as function of SNR and adaptation scheme

| snr | model | del | sub | ins | cor | acc | wer |
|---|---|---|---|---|---|---|---|
| 36 | SI   | 29  | 104 | 35 | 96.65 | 95.77 | 4.23 |
|    | SMD  | 10  | 24  | 13 | 99.14 | 98.82 | 1.18 |
|    | D    | 8   | 21  | 8  | 99.27 | 99.07 | 0.93 |
|    | SMND | 8   | 19  | 8  | 99.32 | 99.12 | 0.88 |
| 30 | SI   | 39  | 114 | 39 | 96.15 | 95.16 | 4.84 |
|    | SMD  | 12  | 34  | 15 | 98.84 | 98.46 | 1.54 |
|    | D    | 6   | 26  | 6  | 99.19 | 99.04 | 0.96 |
|    | SMND | 7   | 21  | 7  | 99.29 | 99.12 | 0.88 |
| 24 | SI   | 117 | 148 | 60 | 93.32 | 91.81 | 8.19 |
|    | SMD  | 34  | 69  | 31 | 97.41 | 96.62 | 3.38 |
|    | D    | 7   | 37  | 7  | 98.89 | 98.72 | 1.28 |
|    | SMND | 7   | 31  | 7  | 99.04 | 98.87 | 1.13 |
| 18 | SI   | 277 | 266 | 95 | 86.32 | 83.93 | 16.07 |
|    | SMD  | 150 | 148 | 80 | 92.49 | 90.48 | 9.52 |
|    | D    | 32  | 59  | 11 | 97.71 | 97.43 | 2.57 |
|    | SMND | 30  | 59  | 12 | 97.76 | 97.46 | 2.54 |

TABLE 2

Recognition results for GSN noise as function of SNR and adaptation scheme

| snr | Model | del | sub | ins | cor | acc | wer |
|---|---|---|---|---|---|---|---|
| 36 | SI   | 23  | 93  | 32 | 97.08 | 96.27 | 3.73 |
|    | SMD  | 8   | 23  | 11 | 99.22 | 98.94 | 1.06 |
|    | D    | 9   | 17  | 9  | 99.35 | 99.12 | 0.88 |
|    | SMND | 8   | 18  | 8  | 99.35 | 99.14 | 0.86 |
| 30 | SI   | 29  | 99  | 35 | 96.78 | 95.89 | 4.11 |
|    | SMD  | 11  | 37  | 14 | 98.79 | 98.44 | 1.56 |
|    | D    | 9   | 25  | 9  | 99.14 | 98.92 | 1.08 |
|    | SMND | 7   | 23  | 7  | 99.24 | 99.07 | 0.93 |
| 24 | SI   | 90  | 119 | 51 | 94.74 | 93.45 | 6.55 |
|    | SMD  | 33  | 65  | 33 | 97.53 | 96.70 | 3.30 |
|    | D    | 11  | 50  | 8  | 98.46 | 98.26 | 1.74 |
|    | SMND | 9   | 47  | 9  | 98.59 | 98.36 | 1.64 |
| 18 | SI   | 206 | 212 | 97 | 89.47 | 87.03 | 12.97 |
|    | SMD  | 120 | 171 | 60 | 92.67 | 91.16 | 8.84 |
|    | D    | 91  | 81  | 19 | 95.67 | 95.19 | 4.81 |
|    | SMND | 23  | 103 | 14 | 96.83 | 96.47 | 3.53 |

Table 1 and Table 2 summarize the results at different SNR, for HWY and GSN, respectively. We also include the results by directly adapting SI models to noisy speech, rather than from SMD models. This type of models will be referred to as D.

Figure 5:
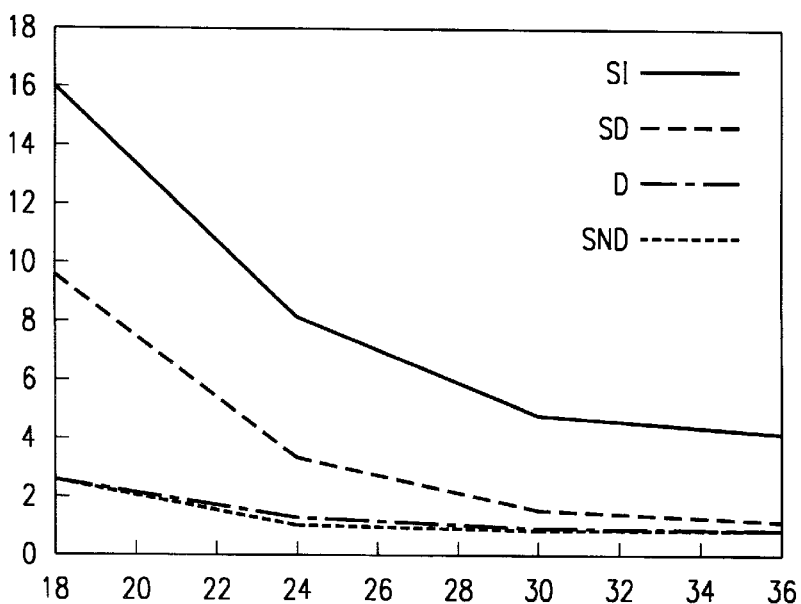
FIG. 5 illustrates WER as a function of SNR and model types.

FIG. 5 graphically displays the WER for HWY tests. Similar trends are found for GSN tests.

With six digit sequence utterances, MLLR adaptation to speaker and microphone substantially reduces the WER (for 24 dB: from 8.19% to 3.38%).

With noise recording, MLLR adaptation to noise further substantially reduces the WER (for 24 dB: 3.38% to 1.13%).

SMDN (two-stage) gives slight and consistent lower error rates than D (single-stage), which could be attributed to the better initial segmentation for adapting to noisy speech used by SMND.

Experimental results suggest that, for digit sequence, such schemes could divide the errors of a baseline GMHMM by about 5, and results in a 1.5% of WER.

What is claimed is:

1. A method of modeling speech comprising:

providing speaker-independent HMM seed model;

first adapting said speaker-independent HMM seed model set to a speaker and microphone dependent model set;

second adapting said speaker and microphone dependent model set to a noise dependent model set to form a speaker, microphone and noise dependent model set; and recognizing incoming speech using said speaker, microphone and noise dependent model set.

2. The method of claim 1 wherein said first adapting step, where said speaker-independent HMM seed model set to a speaker and microphone dependent model set, includes the step of acquiring quiet speech microphone data in a low noise environment using a microphone to be used in recognition and the step of adapting said seed model using said quiet speech microphone data.

3. The method of claim 2 wherein said second adapting step includes providing a source of noise and summing said source of noise and said quiet speech microphone data acquired in low noise environment; and modifying the speaker and microphone dependent model set using the sum of said source of noise and said quiet speech microphone data to form said speaker, microphone and noise dependent model set.

4. The method of claim 3 wherein said second adapting step uses MLLR adaptation.

5. The method of claim 1 wherein said first adapting step is performed every time the speaker or microphone is changed. overcome.

6. The method of claim 1 wherein said second adapting step is performed each time a new type of background noise is detected.

* * * * *